US012800144B2

(12) United States Patent
Paubel et al.

(10) Patent No.: US 12,800,144 B2
(45) Date of Patent: Nov. 17, 2026

(54) COMBUSTION PROCESS

(71) Applicant: L'Air Liquide Société Anonyme pour l'Etude et l'Exploitation des Procédés Georges Claude, Paris (FR)

(72) Inventors: Xavier Paubel, Montigny le Bretonneux (FR); Abou Ba, Jouy-en-Josas (FR); Frank Rheker, Dusseldorf (DE); Laurent Kepinski, Cracow (PL); Mohand Amirat, Gas (FR); Jean-Baptiste Senechal, Franconville (FR); Sarah Juma, Versailles (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 817 days.

(21) Appl. No.: 18/080,429

(22) Filed: Dec. 13, 2022

(65) Prior Publication Data

US 2023/0194082 A1 Jun. 22, 2023

(30) Foreign Application Priority Data

Dec. 21, 2021 (EP) .................................... 21216323

(51) Int. Cl.
*F23L 7/00* (2006.01)
*F23G 7/06* (2006.01)
(Continued)

(52) U.S. Cl.
CPC ................ *F23G 7/06* (2013.01); *F23L 7/007* (2013.01); *F23N 5/18* (2013.01); *F27D 2019/0031* (2013.01)

(58) Field of Classification Search
CPC . F23N 2900/05001; F23N 2900/05002; F23N 2900/05003; F23N 1/022;
(Continued)

(56) References Cited

U.S. PATENT DOCUMENTS 4,492,559 A * 1/1985 Pocock .................. F23N 1/022 431/12
6,247,416 B1 6/2001 Beaudoin et al.
(Continued)

FOREIGN PATENT DOCUMENTS

EP 0 949 477 10/1999
EP 2 115 977 8/2018
(Continued)

OTHER PUBLICATIONS

European Search Report for corresponding EP 21216323, Jun. 29, 2022.

*Primary Examiner* — Jorge A Pereiro
(74) *Attorney, Agent, or Firm* — Allen E. White; Elwood L. Haynes

(57) ABSTRACT

Combined combustion and post-combustion method whereby flue gas is generated by combustion in a main combustion zone, the flue gas being evacuated from the main combustion zone and introduced into a post-combustion zone where the flue gas is subjected to post-combustion and post-combusted gas is obtained which is evacuated from the post-combustion zone, whereby a first level of one or more combustible substances in the flue gas evacuated from the main combustion zone and/or a second level of one or more combustible substances in the post-combusted gas evacuated from the post-combustion zone is/are monitored, whereby a control signal is generated on the basis of the monitored level(s) and whereby the post-combustion oxidant injection rate or the stoichiometric excess of post-
(Continued)

combustion-oxidant with respect to post-combustion fuel is regulated in function of said control signal.

16 Claims, 1 Drawing Sheet

(51) Int. Cl.
*F23N 5/18* (2006.01)
*F27D 19/00* (2006.01)

(58) Field of Classification Search
CPC ......... F23N 5/003; F23G 7/065; F23J 15/003; F23J 15/02; F23J 15/08
See application file for complete search history.

(56) References Cited

U.S. PATENT DOCUMENTS

| | | | | |
|---|---|---|---|---|
| 2006/0048500 | A1* | 3/2006 | Loving | F01N 3/30 60/285 |
| 2008/0153042 | A1* | 6/2008 | Laux | F23J 15/003 110/345 |
| 2011/0154949 | A1 | 6/2011 | Rheker | |
| 2013/0115560 | A1 | 5/2013 | Beaudoin et al. | |
| 2016/0305655 | A1* | 10/2016 | Tulokas | F01N 3/101 |
| 2016/0305659 | A1* | 10/2016 | Tulokas | F23N 1/002 |
| 2017/0198371 | A1 | 7/2017 | Ayhan et al. | |
| 2018/0112868 | A1 | 4/2018 | Suzuki | |
| 2021/0033341 | A1* | 2/2021 | Fujishima | F23N 5/102 |
| 2021/0131661 | A1* | 5/2021 | Glasband | F02B 43/10 |

FOREIGN PATENT DOCUMENTS

| | | | | |
|---|---|---|---|---|
| EP | 3771863 | A1 * | 2/2021 | F27D 19/00 |
| EP | 4 092 390 | | 11/2022 | |
| ES | 2 201 885 | | 3/2004 | |
| ES | 2201885 | A1 * | 3/2004 | |
| ES | 2 207 389 | | 5/2004 | |
| JP | 57067724 | A * | 4/1982 | |
| JP | 2021 025687 | | 2/2021 | |
| KR | 970062490 | A * | 9/1997 | F23N 5/003 |
| SU | 1617261 | A * | 12/1990 | |
| WO | WO-8001603 | A1 * | 8/1980 | F23N 5/006 |
| WO | WO 2006 117336 | | 11/2006 | |
| WO | WO-2006117336 | A1 * | 11/2006 | F27D 7/02 |
| WO | WO-2008053957 | A1 * | 5/2008 | B01D 53/8646 |
| WO | WO 2010 022964 | | 3/2010 | |
| WO | WO 2011 131880 | | 10/2011 | |
| WO | WO 2021 129564 | | 7/2021 | |

* cited by examiner

COMBUSTION PROCESS

CROSS REFERENCE TO RELATED APPLICATIONS

This application claims the benefit of priority under 35 U.S.C. § 119 (a) and (b) to European Patent Application No. 21216323.2, filed Dec. 21, 2021, the entire contents of which are incorporated herein by reference.

BACKGROUND

The present invention relates to the field of combustion. The present invention relates more specifically to combustion processes, whereby fuel is combusted with oxidant in the combustion zone of a furnace, hereafter referred to as the main combustion zone, and whereby flue gas evacuated from the said combustion zone is subjected to post combustion in a post-combustion zone downstream of the main combustion zone in the flow direction of the flue gas.

For maximum heat generation in the main combustion zone, it is generally preferable to achieve complete combustion within the main combustion zone. In that case, the flue gas from the combustion zone is free of residual combustible matter.

In order to achieve complete combustion in the main combustion zone, combustion oxidant must be supplied to the main combustion zone in at least the stoichiometric amount with respect to the fuel. In actual practice, a small excess of oxidant with respect to the stoichiometric amount is necessary to achieve complete combustion. A large excess of oxidant likewise permits complete combustion, but dilutes the combustion and thus lowers the flame temperature. In addition, when oxygen-enriched air or oxygen is used as the combustion oxidant, a large excess of oxidant would also increase the costs connected to the supply of oxidant to the process.

In practice, complete combustion in the main combustion zone is not always possible or even desirable.

For example, for certain processes, a reducing furnace atmosphere is required, for example in order to avoid undesired oxidation of a charge which is heated inside the main combustion zone. This is often the case for furnaces for melting non-ferrous metals. If a reducing atmosphere is required, operating the main combustion zone with an excess of oxygen is obviously excluded.

Moreover, in some processes, such as waste incineration installations or secondary aluminium melting furnaces in which contaminated aluminium, such as painted drink cans, is melted, combustible matter is, at least in part, released in an uncontrolled manner and amount by the charge. As a consequence, it is not possible accurately to predict the amount of oxidant corresponding to the stoichiometric amount at different moments in time throughout the process.

In order to optimize the combustion process in such furnaces, monitoring methods have been proposed which monitor changes in the amount of combustible matter released by the charge in the main combustion zone, so as to enable the furnace operator to respond quickly thereto by adjusting the controlled supply of combustion oxidant and/or fuel to the main combustion zone. Examples of such monitoring processes are described in ES-A-2201885, ES-A-2207389, EP-A-0949477, WO-A-2010022964, WO-A-2011131880 and JP-A-2021025681.

As these methods respond to an actual change in the amount of combustible matter released or in the amount of residual combustible matter in the flue gas, they make it possible to reduce the level of such residual combustible matter, but cannot fully prevent their presence, in particular, but not only, when the main combustion zone is operated with a reducing atmosphere.

Ventilating residual combustible matter into the atmosphere is often not permitted for environmental reasons. In addition, evacuating residual combustible matter from the process also corresponds to a loss of thermal energy, which would have been produced had all combustible matter been burnt completely.

For these reasons, it is increasingly common to use a post combustor in which residual combustible matter present in the flue gas is completely or substantially completely combusted with post-combustion oxidant before the flue gas is released into the atmosphere.

Post-combustion of the flue gas may be achieved by injecting post-combustion oxidant only into the post combustor or by injecting post-combustion oxidant and post-combustion fuel into the post combustor with a stoichiometric excess of post-combustion oxidant with respect to the post-combustion fuel. Injecting both post-combustion oxidant and post-combustion fuel into the post combustor is particularly useful when residual combustible matter is present in the flue gas at relatively low concentration and when the injection of post-combustion fuel into the post combustor is required in order to raise the temperature so as to ignite and burn the residual combustible matter.

Post combustors are advantageously equipped with energy recovery means for recovering and exploiting thermal energy generated by the post combustion.

It is an aim of the present invention to provide such a combined combustion and post-combustion process with optimized post combustion.

It is a further aim of the present invention to provide a combined combustion and post-combustion process whereby both the combustion in the main combustion zone and the post-combustion in the post-combustion zone are optimized.

Thereto, the present invention proposes a mufti-step combined combustion and post-combustion method.

SUMMARY

In a first step of the method of the invention, hereafter referred to as "step a)", a nominal post-combustion operation mode is defined for a post-combustion zone. When the post-combustion zone is an oxidant-only post-combustion zone, i.e. a post-combustion zone which is not equipped or regulated for the injection of post-combustion fuel therein, but only for the injection of post-combustion oxidant therein, the defined nominal post-combustion operation mode presents a nominal post-combustion-oxidant injection rate into the post-combustion zone.

When, on the other hand, the post-combustion zone is an oxidant-fuel post-combustion zone, i.e., a post-combustion zone which is equipped or regulated for the injection of both post-combustion oxidant and post-combustion fuel therein, the nominal post-combustion operation mode presents both a nominal post-combustion-oxidant injection rate and a nominal post-combustion-fuel injection rate into the post-combustion zone. The nominal post-combustion-oxidant injection rate and the nominal post-combustion-fuel injection rate are such that a nominal stoichiometric excess of the post-combustion oxidant with respect to the post-combustion fuel is defined.

In a further step of the method of the invention, referred to hereafter as step b), fuel and combustion oxidant are supplied to the main combustion zone. The rate at which fuel is supplied to the main combustion zone in step b) is referred to as the "actual fuel supply rate" and the rate at which combustion oxidant is supplied to the main combustion zone is referred to as the "actual oxidant supply rate".

In step c), the thus supplied fuel (i.e. the fuel which is supplied to the main combustion zone at the actual fuel supply rate) is combusted with the supplied oxidant (i.e. the oxidant which is supplied to the main combustion zone at the actual oxidant supply rate) inside the main combustion zone, whereby heat and flue gas are produced. As explained earlier, said flue gas may contain residual combustible matter.

In step d) of the method, the flue gas is evacuated from the main combustion zone and introduced into the post-combustion zone.

In step e) oxidant (referred to as "post-combustion oxidant") or a combination of post-combustion oxidant and fuel (the latter being referred to as "post-combustion fuel"), with a stoichiometric oxidant excess of post-combustion oxidant with respect to post-combustion fuel, necessary for the post combustion of the evacuated flue gas is/are introduced into said post-combustion zone.

Thus, in said step e), when the post-combustion zone is an oxidant-only post-combustion zone, post-combustion oxidant is injected into the post-combustion zone at an actual post-combustion-oxidant injection rate, while no post-combustion fuel is injected therein.

When the post-combustion zone is an oxidant-fuel post-combustion zone, both post-combustion oxidant and post-combustion fuel are injected into the post-combustion zone in step e). The post-combustion oxidant is injected at an actual post-combustion oxidant injection rate and the post-combustion fuel is injected at an actual post-combustion fuel injection rate. The actual post-combustion-oxidant injection rate and the actual post-combustion-fuel injection rate together define an actual stoichiometric excess of post-combustion oxidant with respect to the post-combustion fuel, said actual stoichiometric excess of post-combustion oxidant is not used for the combustion of the post-combustion fuel and is thus available for the combustion of the residual combustible matter of the flue gas inside the post-combustion zone.

In step f), the evacuated flue gas is subjected to post combustion in said post-combustion zone, with the post-combustion oxidant, respectively the excess of post-combustion oxidant. During said post combustion, residual combustible matter present in the flue gas evacuated from the main combustion zone is combusted, resulting in a post-combusted gas.

In step g) the thus post-corn busted gas is evacuated from the post-combustion zone.

In step h) of the method according to the invention, a first level of one or more combustible substances in the flue gas evacuated from the main combustion zone and/or a second level of one or more combustible substances in the post-combusted gas evacuated from the post-combustion zone is, respectively are, monitored.

Thereupon, in step i), a first control signal is generated on the basis of the (first or second) level monitored in step h) or on the basis of one or both of the first and second levels monitored in step h).

In step j), the post combustion in the post-combustion zone is regulated.

When the post-combustion zone is an oxidant-only post-combustion zone, the actual post-combustion-oxidant injection rate into the post-combustion zone is regulated in step j) in function of the first control signal.

When the post-combustion zone is an oxidant-fuel post-combustion zone, the actual stoichiometric excess of post-combustion-oxidant is regulated in step j) in function of the first control signal through the actual post-combustion-oxidant injection rate and/or the actual post-combustion-fuel injection rate.

The first control signal is thus generated for the purpose of regulating the post combustion. To the extent that this is achieved, the nature (digital (electronic) or analogue (such as pneumatic)) or the value of the first control signal is unimportant.

The monitoring in step h) may be the monitoring of a single combustible substance in the corresponding gas flow or the monitoring of multiple combustible substances in said gas flow. Examples of such combustible substances are $H_2$, CO and VOCs (Volatile Organic Compounds). Various sensors for monitoring these combustible substances in a gas flow are commercially available. The substance or substances to be monitored will be selected in function of the type of process taking place in the main combustion zone and the type and levels of combustible substances that may be present in the flue gas evacuated therefrom. Essential in this respect is that the level of the monitored combustible substance or substances must be readily and rapidly measurable and must provide a clear indication of the completeness or level of incompleteness of the main combustion (when the evacuated flue gas is monitored), respectively of the post combustion (when the post-combusted gas is monitored). The substance or substances to be monitored may also be selected in function of environmental regulations, in particular in order to ensure that the level of said substance or substances in the post-combusted gas remains below the limit value imposed by said environmental regulations.

The monitoring may be a direct monitoring, whereby the level of the substance or substances in the gas flow is measured, for example in situ, i.e. in the gas flow itself, or through sampling. The monitoring may also be an indirect monitoring of the substance or substances, whereby a property correlated to the level of the one or more combustible substances is measured, such as intensity of a flame generated when the one or more combustible substances in the gas flow are brought into controlled contact with an oxidant, for example via an air-gap or through the controlled injection of an oxidant, such as air or oxygen, into the monitored gas, as for example described in EP-A-2561295. Indirect monitoring via a property correlated to the level of the one or more combustible substances, may also be based on a temperature or a temperature change or evolution in the monitored gas when the one or more combustible substances in the monitored gas flow are brought into controlled contact with such an oxidant, as for example described in ES-A-2201885, ES-A-2207389 and WO-A-2006117336.

Combustion flue gas is frequently evacuated from the main combustion zone at high temperatures. In that case, said flue gas contains significant amounts of residual heat. Moreover, the post-combustion of combustible substances in the evacuated flue gas also generates heat. Consequently, a heat-recovery installation may advantageously be provided in and/or downstream of the post-combustion zone. The thermal energy recovered by said heat-recovery installation may be used as a heat source, for example for the preheating of fuel and/or oxidant upstream of the main combustion zone and/or of the post-combustion zone, for heating or drying a charge supplied to the main combustion zone, for generating steam or for generating mechanical or electrical power.

Post-Combustion Regulation on the Basis of a Level of Combustible Substance(s) in the Post-Combusted Gas According to one embodiment of the method, step h) includes the monitoring of the level, referred to as second level, of one or more combustible substances in the post-combusted gas evacuated from the post-combustion zone and the first control signal is generated in step i) on the basis of said second monitored level (also referred to as 'signal B' or 'level B').

In that case, step a) may include defining an upper threshold B1up for said second monitored level. When the second monitored level of residual combustible matter in the post-corn busted gas exceeds the upper threshold B1up, the first control signal generated in step i) causes, in step j)

1) the actual post-combustion-oxidant flow to be regulated so as to be higher than the nominal post-combustion-oxidant flow, in the case of an oxidant-only post-combustion zone or
2) the actual stoichiometric excess of post-combustion-oxidant to be regulated so as to be greater than the nominal stoichiometric excess of post-combustion-oxidant, in the case of an oxidant-fuel post-combustion zone.

In what follows, this post-combustion operation mode (as described in 1) and 2) above) is referred to as the "boosted post-combustion" operation mode.

As an alternative or in combination with the above, step a) may include defining a positive upper threshold RB1up for a rate of change of the second monitored level (signal B). The rate of change corresponds to an increase or decrease per unit of time of the monitored level of the monitored substance(s). The change is positive in case of an increase of the monitored level of the one or more combustible substances and negative in case of a decrease of said monitored level. The change is zero (0), when the monitored level is constant. The positive upper threshold RB1up thus corresponds to an upper threshold for the increase (per time unit) of the second monitored level.

When the second monitored level increases at a rate greater than upper threshold RB1up, the first control signal generated in step i) causes, in step j) the post-combustion zone to operate in the boosted post-combustion operation mode.

As described in WO-A-2010/022964, responding to a rate of increase of the first monitored level permits a more efficient response to pronounced peaks in the level of combustible substances in the post-combusted gas.

As also indicated earlier, the monitoring of the level of one or more combustible substance(s) may be a direct monitoring, whereby the level of the substance or substances in the gas flow is measured, or an indirect monitoring, whereby a property correlated to the level of the one or more combustible substances is measured. In the latter case, it is possible to compare the rate of change of the monitored level with threshold RB1up, by comparing the rate of change of the measured correlated property with a threshold value for the change of the correlated property corresponding to threshold RB1upm for the rate of change of the monitored level.

It may be useful to combine multiple criteria for the regulation of the post-combustion, in particular thresholds B1up and RB1up.

In the boosted post-combustion operation mode, more post-combustion oxidant is made available for the post-combustion of the evacuated flue gas when the post-combusted gas contains a higher level of combustible substance (s), thus ensuring a more complete post-combustion of the evacuated flue gas in the post-combustion zone than would be the case with the nominal post-combustion mode.

Injecting above nominal flows of post-combustion oxidant, respectively an above nominal excess of post-combustion oxidant to post-combustion fuel is generally only economically justified when this is necessary in order to obtain the desired/required levels of post combustion and to limit the concentration of residual combustible matter in the post-combusted gas.

Therefore, when, in the course of said boosted post-combustion operation mode, the monitored level returns to a "normal" level of combustible substances in the post-combusted gas, the post-combustion in the post-combustion zone has to return to the nominal post-combustion operation mode.

According to one embodiment, step a) may include defining a predetermined duration Δtpcboost of the boosted post-combustion operation, i.e. of the time between the start of boosted post-combustion operation and the return to nominal post-combustion operation. In other words, according to such an embodiment, when the post-combustion zone has been in boosted post-combustion operation for a period Δtpcboost, a first control signal is generated in step i) such that, in step j), 1) the actual post-combustion oxidant flow is regulated to be equal to the nominal post-combustion-oxidant flow, in the case of an oxidant-only post-combustion zone or
2) the actual post-combustion oxidant flow and the actual post-combustion fuel flow are regulated to be equal to respectively the nominal post-combustion oxidant flow and the nominal post-combustion fuel flow.

In other words, the post-combustion is then operated in the nominal post-combustion operation mode.

In order to avoid instability (i.e. frequent switching) in the operation of the post-combustion zone, it may, in the case of such an embodiment, also useful to define in step a) a predetermined duration Δtpclag between the return of the post-combustion zone to nominal post-combustion operation and the next regulation of the post-combustion in accordance with step j), whereby the duration Δtpclag is typically only a fraction of the duration of Δtpcboost. In practice, a duration Δtpclag between 8 and 20 seconds, preferably between 8 and 12 seconds has been found useful.

Embodiments with a predetermined duration Δtpcboost of the boosted post-combustion operation may in particular be used for well-understood processes, in particular processes whereby it is known that the flue gas from the main combustion zone presents peaks of one or more combustible substances and whereby the duration of said peaks is approximately known, the duration Δtpcboost defined in step a) being selected in function of said known approximate duration, for example equal to or greater than said known approximate duration. The approximate duration of the peaks may be known from earlier monitoring results of the same main combustion zone and process or combined main and post-combustion zone and processes, earlier monitoring results obtained from one or more main combustion zones and processes and/or combined main combustion zones and post-combustion zones or processes, through simulation results of such main combustion or combined main combustion and post-combustion zones and processes, or combinations thereof.

According to an alternative embodiment, step a) comprises defining a lower threshold B1low, whereby B1low≤B1up, for the second monitored level, i.e. for the monitored level of combustible substance(s) in the post-combusted gas, When the second monitored level is below said lower threshold B1low, the first control signal generated in step i) is such that, in step j), 1) the actual post-combustion oxidant flow is regulated to be equal to the nominal post-combustion-oxidant flow, in the case of an oxidant-only post-combustion zone or
2) the actual post-combustion oxidant flow and the actual post-combustion fuel flow are regulated to be equal to respectively the nominal post-combustion oxidant flow and the nominal post-combustion fuel flow, i.e. so that the post-combustion is operated in the nominal post-combustion operation mode.

Alternatively, or in combination with the above embodiment, step a) may include defining a lower threshold B2low for the second monitored level and a corresponding time period ΔtB, whereby B2low≤B1up.

When the second monitored level remains below lower threshold B2low during at least time period ΔtB, again, the first control signal generated in step i) is so that, in step j) the post-combustion is regulated to operate in the nominal post-combustion operation mode.

Defining the lower threshold B1low thus provides a mechanism for the post-combustion to return to the nominal post-combustion mode when the monitored level of combustible substance(s) in the post-combusted gas has dropped to a sufficiently low level (below B1low). Defining the lower threshold B2low and the corresponding time period ΔtB provides a mechanism for the post-combustion to return to the nominal post-combustion mode when the monitored level of combustible substance(s) in the post-combusted gas has consistently (i.e. during at least ΔtB) remained sufficiently low (below B2low). The latter feature is of particular interest for processes whereby the monitored level of combustible substance(s) in the post-combusted gas tends to vary frequently, in that applying the criterion over a period ΔtB increases the stability of the post-combustion regulation. When the two options are combined, then B1low is normally selected lower than B2low.

B1low or B2low may be equal to B1up. In that case, the post-combustion is regulated according to the principle that, when the second monitored level is above threshold value B1up, the post-combustion is regulated in boosted post-combustion operation mode and, when the second monitored level is below threshold value B1up, or remains below threshold value B1up for a duration of at least ΔtB, the post-combustion is regulated in nominal post-combustion operation mode.

In order to reduce the frequency of switching from boosted post-combustion operation mode to nominal post-combustion operation mode, while still providing effective regulation, B1low or B2low may be selected below B1up, i.e. B1low, B2low<B1up.

A method, according to the present invention, whereby the post-combustion is regulated on the basis of a monitored level of combustible substance(s) in the post-combusted gas is useful for a wide range of main combustion processes, including those main combustion processes whereby the efficiency or productivity of a transformation process (such as a melting or sintering process) conducted in the main combustion zone takes precedence over the control of the composition of the flue gas leaving said main combustion zone. The thus regulated post-combustion substantially reduces or even eliminates emissions into the environment of combustible substances, while allowing for further energy recovery.

The regulation of the post-combustion on the basis of a monitored level of combustible substance(s) in the post-combusted gas is particularly useful when monitoring a level of one or more combustible substances in the flue gas evacuated from the main combustion zone upstream of the post-combustion zone is impractical. This may, for instance, be the case when the main combustion zone and the post-combustion zone are located within a same reactor, with, for example, the main combustion zone being located at the bottom of the reactor and the post-combustion zone being located near the top of the reactor above the main combustion zone.

Post-Combustion Regulation on the Basis of a Level of Combustible Substance(s) in the Flue Gas The first control signal, used for regulating the post-combustion in step j), may also be generated in step i) on the basis of the first monitored level of one or more combustible substances in the flue gas evacuated from the main combustion zone and upstream of the post-combustion zone (level C).

Such monitoring of the first level of one or more combustible substances in the evacuated flue gas may readily be realized when the evacuated flue gas flows from the main combustion zone to the post-combustion zone via a gas duct connecting the two zones.

The different embodiments described above with respect to the regulation of the post-combustion on the basis of the second monitored level of combustible substance(s) in the post-combusted gas, can in an analogous manner be applied to post-combustion regulation on the basis of the first monitored level.

Thus, step a) may further comprise defining an upper threshold C1up for said first monitored level. When the first monitored level exceeds the upper threshold C1up, in step i) the first control signal is generated which causes, in step j), the post-combustion to be regulated in the boosted post-combustion operation mode.

As an alternative or in combination with the above, step a) may include defining a positive upper threshold RC1up for a rate of change of the first monitored level (level C). The positive upper threshold RC1up corresponds to an upper threshold for the increase per time unit of the first monitored level.

When the first monitored level increases at a rate greater than upper threshold RC1up, the first control signal generated in step i) causes, in step j) the post-combustion zone to operate in the boosted post-combustion operation mode.

For the return from boosted post-combustion operation mode to nominal post-combustion operation mode, step a) may, as already described above, include defining a predetermined duration Δtpcboost of the boosted post-combustion operation. When the post-combustion zone has been in boosted post-combustion operation for a period Δtpcboost, a first control signal is generated in step i) which causes in step j) the post-combustion zone to operate in the nominal post-combustion operation mode.

Alternatively, the post-combustion in the post-combustion zone may be made to return to the nominal post-combustion operation mode when, in the course of said boosted post-combustion operation mode, the monitored level returns to a “normal” level of the one or more combustible substance(s).

Thereto, step a) may comprise:

i) defining a lower threshold C1low for the first monitored level, and/or ii) defining a lower threshold C2low for the first monitored level and a corresponding time period ΔtC.

When the first monitored level is below threshold C1low or remains below lower threshold C2low during at least time period ΔtC, the first control signal generated in step i) causes the post-combustion to be regulated in step j) so as to operate in the nominal post-combustion operation mode.

The comments made hereinabove with respect to thresholds B1low, B2low, ΔtB, B1up and RB1up apply mutates mutandis to C1low, C2low, ΔtC, C1up and RC1up.

Regulation of the post-combustion on the basis of a monitored level of combustible substance(s) in the evacuated flue gas is particularly useful when, at least during certain phases of the combined process of main and post-combustion, the level of the monitored combustible substance(s) in the post-combusted gas is so low that the sensitivity of the monitoring method and/or device is insufficient to allow an accurate detection of the level of the monitored combustible substance(s), so that no accurate regulation of the post-combustion is possible during said phases.

Compared to regulation on the basis of a monitored level of combustible substance(s) in the post-corn busted gas, the regulation of the post-combustion on the basis of a monitored level of combustible substance(s) in the evacuated flue gas also has the advantage of permitting a more rapid response, in that the regulation is based on the gas flow entering, rather than leaving, the post-combustion zone.

Post-Combustion Regulation on the Basis of a Level of Combustible Substance(s) in the Flue Gas and in the Post-Combusted Gas It is also possible to combine the two above possibilities and its advantages, by generating, in step i), the first control signal, which is used to regulate the post-combustion in step j), on the basis of both the first monitored level of one or more combustible substances in the evacuated flue gas upstream of the post-combustion zone (level C) and the second monitored level of one or more combustible substances in the post-combusted gas (level B).

In that case, step a) may, for example, usefully comprise:

i) defining an upper threshold C1'up for the first monitored level of one or more combustible substances in the evacuated flue gas and ii) defining an upper threshold B1'up for the second monitored level of one or more substances in the post-combusted gas, When the first monitored level exceeds upper threshold C1'up or when the second monitored level exceeds upper threshold B1'up, the first control signal generated in step i) causes, in post-combustion regulation step j), the post-combustion to be operated in the boosted post-combustion operation mode.

In order to regulate the return to the nominal post-combustion operation mode, step a) may also include:

i) defining a lower threshold C1'low for the first monitored level of one or more combustible substances in the evacuated flue gas and a lower threshold B1'low for the second monitored level of one or more combustible substances in the post-combusted gas, and/or ii) defining a lower threshold C2'low for the first monitored level and a corresponding time period ΔtC' and a lower threshold B2'low for the second monitored level and a corresponding time period ΔtB', When the first monitored level is below lower threshold C1'low and the second monitored level is below threshold B1'low or when the first monitored level remains below lower threshold C2'low during at least time period ΔtC' and the second monitored level remains below lower threshold B2'low during at least time period ΔtB', the generated first control signal causes the post-combustion in step j) to be regulated to operate in the nominal post-combustion operation mode.

Again, the comments made hereinabove with respect to thresholds B1low, B2low, ΔtB and B1up apply mutatis mutandis to C1'low, C2'low, ΔtC' and C1'up, as well as to B1'low, B2'low, ΔtB' and B1'up.

It is also technically possible to combine the lower threshold C1'low for the first monitored level with the lower threshold B2'low and the corresponding time period ΔtB' for the second monitored level or to combine the lower threshold B1'low for the second monitored level of one or more combustible substances in the post-combusted gas with the lower threshold C2'low and the corresponding time period ΔtC' for the first monitored level to regulate the return to nominal post-combustion operation.

When the post-combustion is regulated on the basis of a level of combustible substance(s) both in the flue gas and in the post-combusted gas, it is naturally also possible to define in step a) a predetermined duration Δtpcboost of the boosted post-combustion operation, whereby, when the post-combustion zone has been in boosted post-combustion operation for a period of Δtpcboost, a first control signal is generated in step i) which causes in step j) the post-combustion zone to operate in the nominal post-combustion operation mode.

Step a) may then also include defining a predetermined duration Δtpclag between the return of the post-combustion zone to nominal post-combustion operation and the next regulation of the post-combustion in accordance with step j).

The regulation of the post-combustion may be conducted independently of any regulation of the main combustion.

The regulation of the post-combustion according to any one of the embodiments described above may also be combined with the regulation of the main combustion in the main combustion zone, where the flue gas is generated. In particular, the regulation of the post-combustion may advantageously be combined with a regulation of the main combustion so as to limit the level of combustible substances in the flue gas generated by the main combustion.

In that case, step a) of the method according to the present invention may include defining a nominal main combustion operation mode for the main combustion zone with a nominal fuel supply rate and a nominal oxidant supply rate to the main combustion zone, while step i) of the method further includes generating a second control signal on the basis of the first level (level C) and/or second level (level B) monitored in step h). The method then also comprises a step k) of regulating the actual oxidant supply rate and the actual fuel supply rate to the main combustion zone in function of the generated second control signal.

Main-Combustion Regulation on the Basis of a Level of Combustible Substance(s) in the Flue Gas According to one such embodiment, the second control signal for regulating the main combustion is generated in step k) on the basis of the first monitored level (level C) of one or more residual combustible substances in the flue gas evacuated from the main combustion zone.

In such a case, step a) may further comprise defining an upper threshold A1up for the first monitored level (level C). When the first monitored level exceeds said upper threshold A1up, the second control signal generated in step i) causes, in step k), the actual oxidant supply rate and the actual fuel supply rate to the main combustion zone to be regulated so that the ratio between the actual oxidant supply rate and the actual fuel supply rate is higher than the ratio between the nominal oxidant supply rate and the nominal fuel supply rate, thereby making available additional oxygen in the main combustion zone, for example for the combustion of combustible matter present in the charge which is being treated in the furnace. As a consequence, the amount of residual combustible substances evacuated from the main combustion zone together with the flue gas is reduced.

In what follows, such an operation of the main combustion in the main combustion zone is referred to as a "boosted main combustion" operation mode.

As an alternative or in combination with the above, step a) may include defining a positive upper threshold RA1up for a rate of change of the first monitored level (level C). The rate of change corresponds to an increase or decrease per unit of time of the monitored level, expressed for example in ppm/s of the monitored substance(s). The rate of change is positive in case of an increase and negative in case of a decrease. The rate of change is zero (0), when the monitored level is constant. The positive upper threshold RA1up thus corresponds to an upper threshold for the increase (per time unit) of the first monitored level.

When the first monitored level increases at a rate greater than upper threshold RA1 up, the second control signal generated in step i) causes, in step k) the main combustion zone to operate in the boosted main combustion operation mode.

As described in WO-A-2010/022964, responding to a rate of increase of the first monitored level permits a more rapid and more efficient response to changes in the composition of the evacuated flue gas and adjustment of the main combustion operation mode.

As indicated earlier, indirect monitoring, whereby a property correlated to the monitored level is measured and monitored is also possible.

It is preferred to combine both said criteria, i.e. to combine thresholds A1up and RA1up.

As already described with respect to the regulation of the post-combustion taking place in the post-combustion zone, step a) may include defining a predetermined duration Δtmcboost of the boosted main-combustion operation, i.e. of the time between the start of boosted main-combustion operation and the return to nominal main-combustion operation. According to such an embodiment, when the main-combustion zone has been in boosted main-combustion operation for a period of Δtmcboost, a second control signal is generated in step i) which causes in step k) the main-combustion zone to operate in the nominal main-combustion operation mode, regardless of the level or levels monitored in step h) at that moment in time.

In order to avoid instability (i.e. excessively frequent switching) in the operation of the main-combustion zone, it may, in the case of such an embodiment, also useful to define in step a) a predetermined duration Δtmclag between the return of the main-combustion zone to nominal main-combustion operation and the next regulation of the main-combustion in accordance with step k). The duration Δtmclag is typically only a fraction of the duration of Δtmcboost. Δtmclag may, for example, be between 8 and 20 seconds, preferably between 8 and 12 seconds.

Embodiments with a predetermined duration Δtmcboost of the boosted main-combustion operation are particularly useful for well-understood processes, in particular processes whereby it is known that the flue gas from the main combustion zone presents peaks of one or more combustible substances and whereby the duration of said peaks is approximately known, the duration Δtmcboost defined in step a) being selected in function of said known approximate duration, for example equal to or greater than said known approximate peak duration.

The comments made earlier with respect to predetermined duration Δtpcboost, can be applied mutates mutandis to duration Δtmcboost.

As also already described with respect to the regulation of the post-combustion taking place in the post-combustion zone, the main combustion may be made to return to the nominal main combustion operation mode when the monitored level returns to "normal" values.

Thereto, when the main combustion is regulated in function of the first monitored level, step a) may also include:

i. defining a lower threshold A1 low for the first monitored level, and/or ii. defining a lower threshold A2low for the first monitored level and a corresponding time period ΔtA, whereby, when threshold A1low or threshold A2low is used in combination with threshold A1up, then A1low, respectively A2low≤A1up, preferably A1low, respectively A2low<A1up.

When the first monitored level is below lower threshold A1low and/or when the first monitored level remains below lower threshold A2low for at least the time period ΔtA, the second control signal generated in step i) causes, in step k), the actual oxidant supply rate and the actual fuel supply rate to the main combustion zone to be regulated so that the actual oxidant supply rate and the actual fuel supply rate correspond respectively to the nominal oxidant supply rate and the nominal fuel supply rate. In other words, the generated second control signal then causes the main combustion zone to operate in the nominal main-combustion operation mode.

Main-Combustion Regulation on the Basis of a Level of Combustible Substance(s) in the Post-Combusted Gas As indicated earlier, it is not always readily feasible to monitor one or more combustible substances in the evacuated flue gas upstream of the post-combustion zone.

Regulation of the main combustion is, however, also possible on the basis of the second monitored level, i.e. on the basis of the monitored level of one or more combustible substances in the post-combusted gas evacuated from the post-combustion zone.

Thereto, the second control signal may be generated in step i) on the basis of the second monitored level (level B).

In particular, step a) may then comprise defining an upper threshold D1up for the second monitored level, i.e. for the monitored level of one or more combustible substances in the post-combusted gas.

When the second monitored level exceeds the upper threshold D1up, the second control signal generated in step i) causes, in step k), the main combustion zone to operate in boosted main-combustion operation mode.

For the return to the nominal main-combustion operation mode step a) may include defining a predetermined duration Δtmcboost of the boosted main-combustion operation, i.e. of the time between the start of boosted main-combustion operation and the return to nominal main-combustion operation. According to such an embodiment, when the main-combustion zone has been in boosted main-combustion operation for a period of Δtmcboost, a second control signal is generated in step i) which causes in step k) the main-combustion zone to operate in the nominal main-combustion operation mode, regardless of the level or levels monitored in step h) at that moment in time.

As already explained, step a) may then also include defining a predetermined duration Δtmclag between the return of the main-combustion zone to nominal main-combustion operation and the next regulation of the main-combustion in accordance with step k).

Alternatively, step a) may include:

i. defining a lower threshold D1low for the second monitored level, and/or ii. defining a lower threshold D2low for the second monitored level and a corresponding time period ΔtD, with D1low, respectively D2low≤D1up, preferably D1low, respectively D2low<D1up.

When the second monitored level is below threshold D1low or remains below lower threshold D2low during at least time period ΔtD, the second control signal generated in step i) causes, in step k), the main combustion zone to be operated in the nominal main-combustion operation mode.

When the method comprises both the regulation of the post-combustion and the main combustion and the first and second control signal are based on the same monitored level or levels, it may, in certain cases be possible to use the same criteria for switching to the respective boosted operation modes and for switching to the respective nominal operation modes for both the main combustion and the post-combustion. In that case, a single control signal may be used as both the first and the second control signal.

The nominal operation mode or modes defined in step a) correspond to the operation mode of the combustion in the corresponding combustion zone (post-combustion zone, respectively main-combustion zone) without the feedback/feedforward regulation proposed in accordance with the present invention.

The term "nominal" is thus synonymous with the terms "target" or "set" or "preset" as used by the skilled person in, for example, the expressions "target flow rate" or "set flow rate".

Nominal operation modes and the corresponding nominal parameters are thus established by the skilled combustion furnace operator in function of the nature/type/parameters of the process (e.g. incineration, melting, steam production, etc.) and of the equipment (both main combustion equipment and post-combustion equipment) to which the method according to the invention is applied.

The nominal main combustion operation mode thus depends on the furnace in which the main combustion zone is located, on the nature of the process conducted therein and on the production rate of the furnace. As the post-combustion zone receives the flue gas generated in the main combustion zone, the nominal post-combustion operation mode depends on the nature or properties and volume of the flue gas evacuated from the main combustion zone, which in turn depends on the furnace in which the main combustion zone is located and on the nature of the process conducted therein. Specific environmental targets or regulations regarding atmospheric emissions may also have to be taken into account when defining the nominal post-combustion mode.

The nominal operation mode(s), and the corresponding nominal parameters, may be constant over time, for example in a continuously operated furnace without intentional changes in the charge or the product to be produced, in the combustion heat-production rates, in the overall production rates, etc.

The nominal operation modes, and the corresponding nominal parameters, may also vary over time, for example because of changes in the production rate or in the nature of the charge introduced into the furnace, the process conducted therein or the product to be produced thereby.

In particular, in the case of batch or semi-batch processes, the nominal operation modes and the corresponding nominal parameters may also vary cyclically over time, one cycle for each batch. An example of such a batch process is a batch melting process, whereby each batch introduced into the furnace undergoes a heating phase, a melting phase and a refining phase, or at least two of said phases including a melting phase.

The nominal post-combustion operation modes as defined by the skilled person in step a) can thus vary widely. It is a particular advantage of the method according to the present invention that it is suitable and beneficial for such a wide range of operation modes.

Given that the gas which is subjected to post-combustion in the post-combustion zone is the flue gas evacuated from the main combustion zone, whether or not the post-combustion must be regulated to operate in the boosted or in the nominal post-combustion operation mode depends in fine on the main combustion taking place in the main combustion zone, and this regardless of the monitored level used to generate the first control signal.

For this reason, when the method according to the present invention comprises both step j) for regulating the post-combustion and step k) for regulating the main combustion, and both the post-combustion and the main combustion are operating in the corresponding boosted operation mode, it may be advisable to generate the first and second control signals in step i) so that the main combustion mode first returns to its nominal operation mode, when the conditions thereto are met, and so that only thereafter, and again when the conditions thereto are met, the post-combustion is allowed to return to its nominal operation mode.

Should the return of the main combustion from boosted main-combustion operation mode to the nominal main-combustion operation mode, i.e. with reduced oxygen availability for the main combustion, cause the level of residual substances in the flue gas evacuated from the main combustion zone to rise again, thus requiring additional oxygen for the effective post-combustion of said evacuated flue gas, this approach allows the post-combustion to remain in the boosted post-combustion operation mode, thereby maintaining any levels of combustible substance(s) in the post-combusted gas at an acceptable level This is in particular important in order to respect the applicable emission norms. Only when the monitored level of residual combustible substance(s) in the evacuated flue gas remains low after the return to nominal operation of the main combustion zone is the post-combustion zone in turn allowed to return to its nominal operation mode.

Such an embodiment naturally requires a corresponding selection of the criteria for switching the main combustion zone and the post-combustion zone to their respective nominal operation modes.

Thus, in embodiments of the present invention with both regulation of the post-combustion (step j) and regulation of the main combustion (step k), it may be advantageous, when both the main combustion and the post-combustion are in boosted operation mode and both meet the criteria for a switch to their respective nominal operation modes:

first to switch the main combustion zone to the nominal main-combustion operation mode in accordance with step k), thereafter to waft for a lag time period Δtlag, when, at the end of lag time period Δtlag, the criteria for switching the post-combustion zone to the nominal post-combustion operation mode are still met, to switch the post-combustion zone to the nominal post-combustion operation mode in accordance with step j).

Lag time period Δtlag is then likewise defined in step a) of the method according to the invention.

In step a), lag time period Δtlag is defined so that the effect of the return of the main combustion zone to its nominal operation mode on the composition of the flue gas leaving the main combustion zone is reflected by the monitored level or levels used to generate the first control signal used for regulating the post-combustion in step j). The length of lag time period Δtlag is thus defined taking into account the nature of the furnace in which the main combustion zone is located, the nature of the process conducted therein and the length of time required for the flue gas leaving the combustion zone to reach the point or points where the monitoring takes place.

BRIEF DESCRIPTION OF THE DRAWING

The present invention and its advantages are illustrated in the following example with reference to the figure, which is a schematic presentation of an industrial furnace equipped with a post combustor.

DETAILED DESCRIPTION OF PREFERRED EMBODIMENTS

Figure 1:
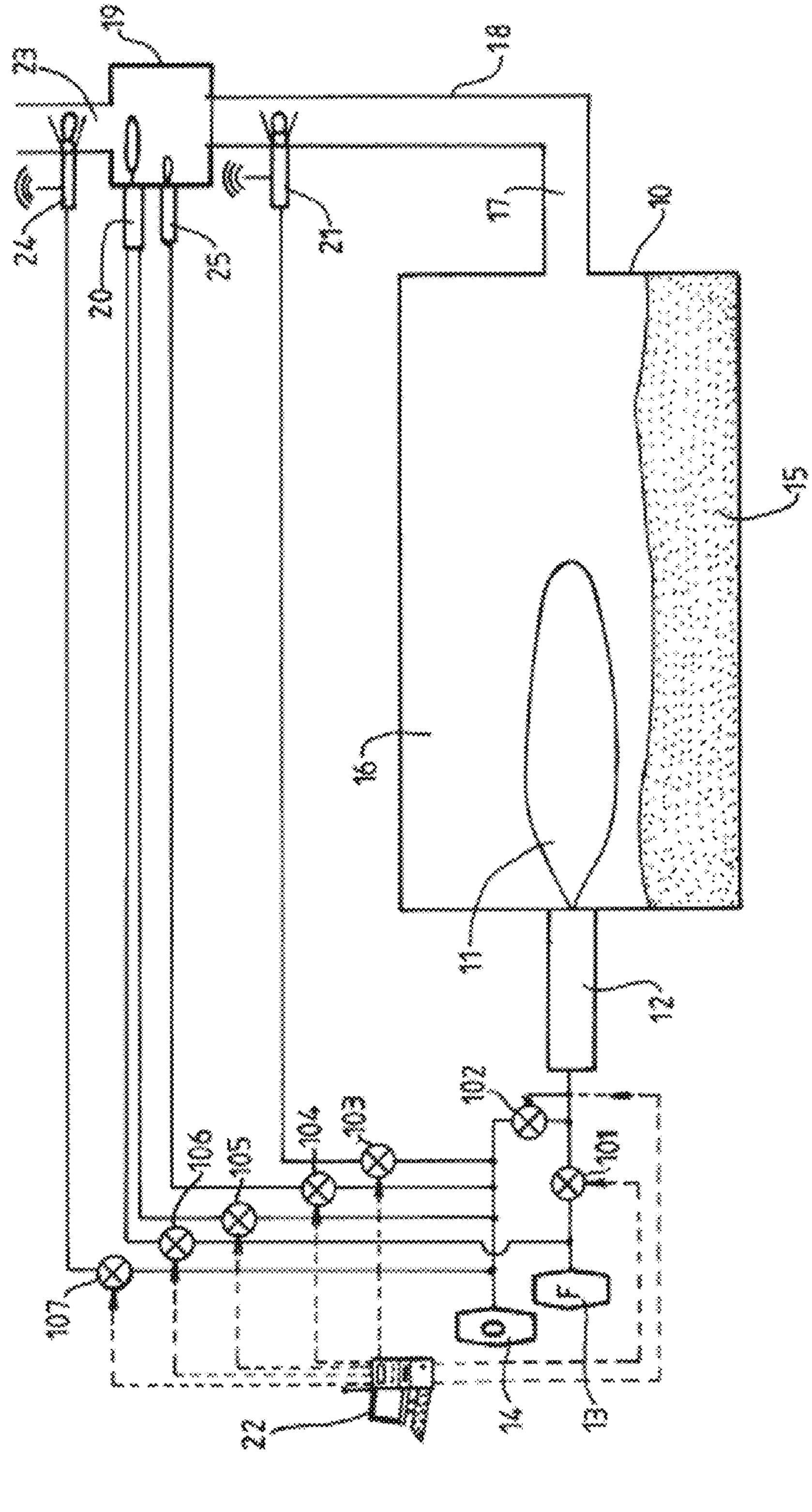

The figure shows a furnace 10, such as a furnace for melting scrap aluminium, whereby the scrap aluminium may be contaminated with combustible contaminants, such as paint and lacquer on aluminium cans and oil.

Furnace 10 defines a main-combustion zone therein, which is heated by the combustion of fuel with oxidant, referred to as "main combustion".

Thereto, furnace 10 is equipped with one or more burners 12 (only one burner is shown, even though multiple burners may be present) fluidly connected to a fuel source 13 and an oxidant source 14. The oxidant supplied by oxidant source 14 is preferably an oxygen-rich oxidant (i.e. an oxidant having an oxygen content higher than that of ambient air), such as oxygen-enriched air or oxygen.

The fuel and the oxidant are supplied to the one or more burners 12 in a controlled manner, i.e. at a regulated flow rate. The main combustion of the fuel with the oxidant in furnace 10 generates heat and combustion gases inside the main-combustion zone of furnace 10 (said main combustion being schematically represented by flame 11, even though said combustion may be in the form of multiple flames or flameless combustion).

Instead of or in combination with burners 12, which inject both fuel and oxidant, fuel and oxidant may also be supplied separately to the main-combustion zone, for example for the purpose of staged or flameless combustion.

In the case of a charge 15 of scrap aluminium to be melted in the main-combustion zone, a reducing atmosphere 16 is desired above charge 15 so as to limit any loss of aluminium metal due to oxidation. A less-than-stoichiometric amount of oxidant (compared to the amount of fuel) is therefore supplied to the burner(s) 12. As a consequence, the flue gas 17 which is evacuated from furnace 10 contains combustible substances.

As the charge 15 of contaminated aluminium is heated, combustible contaminants are typically also released by charge 15 into the atmosphere 16 of the main combustion zone in an uncontrolled manner, i.e. with peaks and dips in the amount of combustibles released. Said released combustible contaminants contribute to the level of combustible substances in flue gas 17.

Other furnaces operate with a neutral (i.e. an atmosphere which is neither oxidizing, nor reducing) or with an oxidizing atmosphere in the main-combustion zone. In such a case, the baseline of the level of combustible substances in the flue gas from the main combustion zone is typically zero or near zero, while occasional peaks of combustible substances may be observed in the evacuated flue gas.

In step a) of the method according to the invention, a nominal main combustion operation mode is defined for the main combustion zone with a corresponding nominal fuel supply rate and a corresponding nominal oxidant supply rate to the main combustion zone via its burner(s) 12.

For example, in the case of a batch scrap aluminium melting process, the furnace operation may comprise an initial heating phase, in which the solid charge 15 is heated to the aluminium melting temperature, a melting phase, during which the solid charge 15 is progressively melted, and a refining phase, during which the molten charge 15 is refined and then maintained at its tapping temperature. For each phase a constant or evolving nominal fuel supply rate and nominal oxidant supply rate to furnace 10 are defined. As explained above, in order to avoid oxidation of the aluminium charge 15, the nominal oxidant supply rate may be kept substoichiometric with respect to the nominal fuel supply rate, in particular during the melting and refining phase of the process (as the molten charge is more susceptible to oxidation).

The flue gas 17 which has been evacuated from the main combustion zone of furnace 10 is transported via conduct 18 to post combustor/post-combustion zone 19. Post-combustion oxidant and post-combustion fuel are injected into post-combustion zone 19 in a controlled manner (i.e. at regulated flow rates) in order to combust combustible substances present in the evacuated flue gas 17 with a controlled stoichiometric excess of post-combustion oxidant with respect to the post-combustion fuel. The thus obtained post-combusted gas 23 is evacuated from post-combustion zone 19.

In the illustrated embodiment, the post combustor 19 is equipped with a burner 20 and a separate post-combustion oxidant injector 25. The post-combustion fuel is supplied to burner 20 together with a stoichiometric amount of post-combustion oxidant. Additional post-combustion oxidant is supplied to injector 25, so as to provide a stoichiometric excess of post-combustion oxidant (compared to the post-combustion fuel) in post combustor 19. Again, whereas only one post-combustion burner 20 and one injector 25 are shown, post combustor 19 may be equipped with multiple burners 20 and/or multiple injectors 25. The use of multiple injectors 25 may in particular be useful to ensure intimate mixing of the stoichiometric excess of post-combustion oxidant with flue gas 17 entering post combustor 19.

In the illustrated embodiment, post-combustion zone 19 is separated from the main-combustion zone by conduct 18 via which flue gas 17 is transported. In other embodiments, the main combustion zone and the post-combustion zone may be located in different parts of a same enclosure, the flue gas generated in the main combustion zone of the enclosure travelling to the post-combustion zone of said enclosure. In that case, the post-combustion zone is advantageously located above the main combustion zone, so as to benefit from the natural upward draft of the generated flue gas.

In the illustrated example, the level of combustible substances, such as H2, CO and/or VOCs, in evacuated flue gas 17 in conduct 18 is determined using sensor 21.

In the illustrated embodiment, sensor 21 is a sensor as described in co-pending patent application ER21152977. The disclosure in said co-pending patent application of said sensor and its operation is incorporated herein by reference. Valve 103 controls the flow of oxidant from oxidant source 14 is supplied to sensor 21.

Other sensors and monitoring devices and methods for monitoring levels of combustible substances in flue gas 17 are commercially available and may be used in the context of the present invention.

The level of combustible substances in evacuated flue gas 17 detected by sensor 21 is transmitted to central control unit 22 and compared with a reference value stored therein. Said reference value corresponds to the level of combustible substances which flue gas 17 would normally be expected to present at the given phase of the batch process and operation parameters, including actual oxidant supply rate and fuel supply rate to burner(s) 12 of furnace 10.

When said comparison by control unit 22 reveals that the detected level of combustible substances in flue gas 17 is significantly higher than the reference level, this is indicative of a peak in the release of combustibles by charge 15 in the main combustion zone.

The level of combustible substances in flue gas 17 detected by sensor 21 is, for example, considered by control unit 22 to be significantly higher than the reference value when the detected level of combustible substances in flue gas 17 is higher than an upper threshold value A1up also defined in step a), whereby threshold value A1up is greater than the reference value.

In that case, control unit 22 generates a control signal, referred to as 'second control signal', which regulates main fuel controller 101 and main oxidant controller 102 so that the furnace is operated in boosted main-combustion operation mode, whereby the ratio between the actual oxidant supply rate and the actual fuel supply rate to burner(s) 12 exceeds the ratio of the nominal oxidant supply rate to the nominal fuel supply rate. In this manner, more oxygen is made available within the main-combustion zone for the combustion of the released combustible matter within said main combustion zone, without generating an oxidizing atmosphere 16 above charge 15.

According to one embodiment, after a predetermined duration Δtmcboost, a different second control signal is emitted so that main fuel controller 101 causes the actual fuel supply rate to burner(s) 12 to correspond to the nominal fuel supply rate and so that the main oxidant controller 102 causes the actual oxidant supply rate to the burner(s) 12 to correspond to the nominal oxidant supply rate.

Alternatively, the return to nominal main combustion may be based on the level of combustible substances in evacuated flue gas 17 detected by sensor 21. For example, when the comparison by central control unit 22 between the detected level of combustible substances in evacuated flue gas 17 sensor 21 is substantially equal to or even lower than the reference value stored in central control unit 22, control unit 22 generates a second control signal which, in the manner described above, causes the main combustion in furnace 10 to return to the nominal main-combustion operation mode.

Whereas the above-described regulation of the main combustion can keep the levels of combustible substances in flue gas 17 leaving furnace 10 within certain limits, it does not as such solve the problem of the release into the atmosphere of the detected levels of combustible substances in evacuated flue gas 17.

This problem is addressed by subjecting evacuated flue gas 17 to post combustion in post-combustion zone 19.

When the temperature of flue gas 17 entering post-combustion zone 19 and the nature and concentration of combustible substances in flue gas 17 is such that ignition of the combustible substances is assured, the post combustion of flue gas 17 can be achieved by the injection of only post-combustion oxidant into post-combustion zone 19, for example via injector 25.

In many cases, both post-combustion oxidant and post-combustion fuel will be injected into post-combustion zone 19 to create a permanent post-combustion flame in zone 19. The post combustion of combustible substances in flue gas 17 is then achieved in post-combustion zone 19 by a stoichiometric excess of post-combustion oxidant with respect to the post-combustion fuel. In the illustrated embodiment, the post-combustion fuel and the corresponding stoichiometric amount of post-combustion oxidant are supplied to burner 20, while the excess of post-combustion oxidant for the post-combustion of the flue gas is injected into the post-combustion zone 19 by means of injector 25.

In step a) of the method according to the invention, a nominal post-combustion operation mode is defined for post-combustion zone 19, with a corresponding nominal post-combustion oxidant injection rate and nominal post-combustion fuel injection rate. The total nominal post-combustion oxidant injection rate and the nominal post-combustion fuel injection rate and in particular the ratio between the two are defined on the basis of the temperature and composition which the evacuated flue gas 17 would normally have when entering post combustor/post-combustion zone 19, given the phase and parameters of the batch process in furnace 10, and keeping in mind any limitations to the level of combustible substances which a gas to be released into the atmosphere imposed by, for example, environmental regulations. In other words, the nominal post-combustion oxidant and fuel injection rates are such that they would result in the effective abatement by post-combustion of the combustible substances in flue gas 17 at the level normally to be expected at the given stage of operation of furnace 10.

In the illustrated embodiment, a further control signal, referred to as 'first control signal', is generated by control unit 22 on the basis of the above-described comparison between the level of combustible substances in evacuated flue gas 17 detected by sensor 21 and the reference value stored in central control unit 22. Said first control signal is sent to first flow controller 104, which regulates the excess of post-combustion oxidant to injector 25.

The flow of post-combustion fuel and the corresponding stoichiometric flow of post-combustion oxidant to post-combustion burner 20 are regulated respectively by controller 106 and controller 105.

When the comparison by control unit 22 reveals that the detected level of combustible substances in flue gas 17 is significantly higher than the reference value, for example by comparing the detected level with an upper threshold level C1up defined in step a), control unit 22 generates a first control signal, which causes first flow controller 104 to increase the excess of post-combustion oxidant to injector 25 to a boosted excess of post-combustion oxidant, which is higher than the excess of post-combustion oxidant during the nominal post-combustion operation mode, so that the ratio of the actual total post-combustion oxidant injection rate to the actual post-combustion fuel injection rate is higher than the ratio of the total nominal post-combustion oxidant injection rate to the nominal post-combustion fuel injection rate. In this manner, extra available post-combustion oxidant is made available for post-combusting the peak in combustible substances present in evacuated flue gas 17 (boosted post-combustion operation mode).

The criteria (such as C1up) for a "significantly higher" level for the regulation of the post-combustion may be the same as or different from the criteria (such as A1up) for a "significantly higher" level for the regulation of the main combustion.

When the comparison by central control unit 22 between the level of combustible substances in evacuated flue gas 17 detected by sensor 21 is substantially equal to or even lower than the corresponding reference value stored in central control unit 22, whereby again, the same or different criteria may be applied for "substantially equal" with respect to the regulation of the main combustion and the regulation of the post-combustion, the first control signal generated by control unit 22 causes second flow controller 104 to regulate the actual post-combustion oxidant injection rate to injector 25, so that the actual stoichiometric excess of post-combustion oxidant injected into post-combustion zone 19 corresponds to the nominal stoichiometric excess of post-combustion oxidant (the actual post-combustion fuel flow to burner 20 and the actual post-combustion oxidant flow to burner 20 being regulated, also on the basis of the first control signal, by respectively controllers 106 and 105 so that the actual post-combustion fuel flow to burner 20 corresponds to the nominal post-combustion fuel flow rate and so that post-combustion oxidant flow to burner 20 is stoichiometric with said actual/nominal post-combustion fuel flow).

In the illustrated embodiment, an extra security has been provided for the control of the post-combustion in post-combustion zone 19, in that a second sensor 24, of the same type as first sensor 21, is present in the exhaust of post combustor 19 and monitors a level of one or more combustible substances in the post-combusted gas 23 leaving post-combustion zone 19.

An upper threshold B1up for said level of combustible substance(s) in post-combusted gas 23 was determined in step a), said upper threshold B1up being higher than a reference value for the level of the monitored combustible substance(s) in post-combusted gas 23. Said reference value corresponds to the level of combustible substances which post-combusted gas 23 would normally be expected to present at the given phase of the batch process and the operation parameters of the main and of the post-combustion zone.

Upper threshold B1up is also at most equal to or preferably below the maximum level of said combustible substance(s) permitted by the local environmental regulations.

Control unit 22 compares the level detected by second sensor 24 with upper threshold B1up and, when the level detected by second sensor 24 is higher than the threshold B1up, control unit 22 generates a first control signal which causes the post-combustion zone 19 to operate in boosted post-combustion operation as described above, and this regardless of the level detected by first sensor 21.

Similarly, when the level detected by first sensor 21 is higher than the threshold level C1up, central control unit 22 generates a first control signal which causes the post-combustion zone 19 to operate in boosted post-combustion operation, regardless of the level detected by first sensor 24.

Only when both the level detected by first sensor 21 and the level detected by second sensor 24 are substantially equal to or even lower than the corresponding reference values stored in central control unit 22 does control unit 22 generate a first control signal on the basis of which controllers 104, 105 and 106 regulate the post-combustion fuel flow and the total post-combustion oxidant flow to post-combustion zone 19 to correspond to the respective nominal flow rates, whereby, as described above, the post-combustion fuel and the stoichiometric flow of oxidant are supplied to burner 20, while the stoichiometric excess of post-combustion oxidant is supplied to injector 25.

Whereas the use of a central control unit 22 is illustrated, it will be appreciated that the method according to the invention may also be implemented with a distributed or modular system using PLCs or the like for comparing detected values with reference values and/or for regulating fuel and/or oxidant supplies.

The above-described embodiment provides a maximum control of the level of combustible substances in the post-combusted gas and thus of the level of combustible substances liable to be released into the atmosphere.

When the abatement of combustible substances in the post-combusted gas is less critical, a less elaborate control system may be used for the post-combustion, for example, based only on the level of combustible substances detected by one of sensors 21 and 24.

REFERENCE NUMBERS IN DRAWING

10: furnace - 11: flame - 12: burner of furnace 10 - 13: fuel source - 14: oxidant source - 15: charge - 16: atmosphere in furnace 10 - 17: evacuated flue gas - 18: flue gas conduct - 19: post combustor/post-combustion zone - 20: burner of post combustor 19 - 21: first sensor - 22: central control unit - 23: post-corn busted gas - 24: second sensor - 25: oxidant injector of post combustor 19 - 101: controller of fuel flow to burner 12 - 102: controller of oxidant flow to burner 12 - 103: controller of oxidant flow to first sensor 21 - 104: controller of oxidant flow to injector 25 - 105: controller of oxidant flow to burner 20 - 106: controller of fuel flow to burner 20 - 107: controller of oxidant flow to second sensor 24.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A combined combustion and post-combustion method comprising:

a) defining a nominal post-combustion operation mode for a post-combustion zone with either:

(1) a nominal post-combustion-oxidant injection rate into the post-combustion zone, when the post-combustion zone is an oxidant-only post-combustion zone which is not equipped for the injection of post-combustion fuel therein, or (2) a nominal post-combustion-oxidant injection rate and a nominal post-combustion-fuel injection rate into the post-combustion zone, when the post-combustion zone is an oxidant-fuel post-combustion zone which is equipped for the injection of both post-combustion oxidant and post-combustion fuel therein, the nominal post-combustion-oxidant injection rate and the nominal post-combustion-fuel injection rate defining a nominal stoichiometric excess of the post-combustion oxidant with respect to the post-combustion fuel, b) supplying fuel and combustion oxidant to a main combustion zone at respectively an actual fuel supply rate and an actual oxidant supply rate, c) combusting the supplied fuel with the supplied oxidant in the main combustion zone, thus producing heat and flue gas, which may contain residual combustible matter, d) evacuating the flue gas from the main combustion zone and introducing the evacuated flue gas into the post-combustion zone, e) injecting, into the post-combustion zone:

(1) post-combustion oxidant at an actual post-combustion-oxidant injection rate and no post-combustion fuel, when the post-combustion zone is an oxidant-only post-combustion zone, or (2) post-combustion oxidant at an actual post-combustion-oxidant injection rate and post-combustion fuel at an actual post-combustion-fuel injection rate, when the post-combustion zone is an oxidant-fuel post-combustion zone, the actual post-combustion-oxidant injection rate and the actual post-combustion-fuel injection rate defining an actual stoichiometric excess of post-combustion oxidant with respect to the post-combustion fuel, f) post-combusting the evacuated flue gas in the post-combustion zone with:

(1) the post-combustion oxidant in the case of an oxidant-only post-combustion zone, or (2) the actual stoichiometric excess of post-combustion oxidant in the case of an oxidant-fuel post-combustion zone, thereby generating a post-combusted gas, g) evacuating the post-combusted gas from the post-combustion zone, h) monitoring a first level of one or more combustible substances in the flue gas evacuated from the main combustion zone and/or a second level of one or more combustible substances in the post-combusted gas evacuated from the post-combustion zone, i) generating a first control signal on the basis of one or both of the levels monitored in step h), and j) regulating, in function of the first control signal:

(1) the actual post-combustion-oxidant injection rate in the case of an oxidant-only post-combustion zone, or (2) the actual stoichiometric excess of post-combustion-oxidant through the actual post-combustion-oxidant injection rate and/or the actual post-combustion-fuel injection rate, in the case of an oxidant-fuel post-combustion zone, and further wherein the combined combustion and post-combustion method comprises the first control signal being generated on the basis of the second monitored level, in which step a) further comprises:

i. defining an upper threshold B1up for the second monitored level, and whereby, when the second monitored level exceeds the upper threshold B1up, the generated first control signal causes, in step j)

(1) the actual post-combustion-oxidant flow to be higher than the nominal post-combustion-oxidant flow, in the case of an oxidant-only post-combustion zone, or (2) the actual stoichiometric excess of post-combustion-oxidant to be greater than the nominal stoichiometric excess of post-combustion-oxidant, in the case of an oxidant-fuel post-combustion zone.

2. The method according to claim 1, whereby step a) further comprises:

i'. defining a lower threshold B1low for the second monitored level, and/or ii'. defining a lower threshold B2low for the second monitored level and a corresponding time period ΔtB, whereby, when the second monitored level is below threshold B1low or remains below lower threshold B2low during at least time period ΔtB, the generated first control signal causes in step j):

(1) the actual post-combustion oxidant flow to equal to the nominal post-combustion-oxidant flow, in the case of an oxidant-only post-combustion zone or (2) the actual post-combustion oxidant flow and the actual post-combustion fuel flow to be equal to respectively the nominal post-combustion oxidant flow and the nominal post-combustion fuel flow in the case of an oxidant-fuel post-combustion zone.

3. The method according to claim 1, whereby the first control signal is generated on the basis of the first monitored level.

4. The method according to claim 3, whereby step a) further comprises:

i. defining an upper threshold C1up for the first monitored level, and whereby, when the first monitored level exceeds the upper threshold C1up, the generated first control signal causes, in step j)

(1) the actual post-combustion-oxidant flow to be higher than the nominal post-combustion-oxidant flow, in the case of an oxidant-only post-combustion zone, or (2) the actual stoichiometric excess of post-combustion-oxidant to be greater than the nominal stoichiometric excess of post-combustion-oxidant, in the case of an oxidant-fuel post-combustion zone.

5. The method according to claim 3, whereby step a) comprises:

i. defining a lower threshold C1low for the first monitored level, and/or ii. defining a lower threshold C2low for the first monitored level and a corresponding time period ΔtC, whereby, when the first monitored level is below threshold C1low or remains below lower threshold C2low during at least time period ΔtC, the generated first control signal causes in step j):

(1) the actual post-combustion oxidant flow to equal to the nominal post-combustion-oxidant flow, in the case of an oxidant-only post-combustion zone, or (2) the actual post-combustion oxidant flow and the actual post-combustion fuel flow to be equal to respectively the nominal post-combustion oxidant flow and the nominal post-combustion fuel flow, in the case of an oxidant-fuel post-combustion zone.

6. The method according to claim 1, whereby the first control signal is generated on the basis of both the first and the second monitored level.

7. The method according to claim 6, whereby step a) comprises:

i. defining an upper threshold C1'up for the first monitored level, and ii. defining an upper threshold B1'up for the second monitored level, and whereby when the first monitored level exceeds upper threshold C1'up or when the second monitored level exceeds upper threshold B1'up, the generated first control signal causes, in step j) p1 (1) the actual post-combustion-oxidant flow to be higher than the nominal post-combustion-oxidant flow in the case of an oxidant-only post-combustion zone or (2) the actual stoichiometric excess of post-combustion-oxidant to be greater than the nominal stoichiometric excess of post-combustion-oxidant, in the case of an oxidant-fuel post-combustion zone.

8. The method according to claim 7, whereby step a) comprises:

i. defining a lower threshold C1'low for the first monitored level and a lower threshold B1'low for the second monitored level, and/or ii. defining a lower threshold C2'low for the first monitored level and a corresponding time period ΔtC' and a lower threshold B2'low for the second monitored level and a corresponding time period ΔtB', whereby, when the first monitored level is below lower threshold C1'low and the second monitored level is below threshold B1'low or when the first monitored level remains below lower threshold C2'low during at least time period ΔtC' and the second monitored level remains below lower threshold B2'low during at least time period ΔtB', the generated first control signal causes in step j):

(1) the actual post-combustion oxidant injection rate to be equal to the nominal post-combustion-oxidant injection rate, in the case of an oxidant-only post-combustion zone (19), or (2) the actual post-combustion oxidant injection rate and the actual post-combustion fuel injection rate to be equal to respectively the nominal post-combustion oxidant injection rate and the nominal post-combustion fuel injection rate, in the case of an oxidant-fuel post-combustion zone.

9. The method according to claim 1, whereby step a) further comprises defining a predetermined duration Δtpcboost and whereby, when, in step j)

(1) the actual post-combustion-oxidant flow has been higher than the nominal post-combustion-oxidant flow, in the case of an oxidant-only post-combustion zone or (2) the actual stoichiometric excess of post-combustion-oxidant has been greater than the nominal stoichiometric excess of post-combustion-oxidant, in the case of an oxidant-fuel post-combustion zone, for a period Δtpcboost, a first control signal is generated in step i) which causes in step j)

(1) the actual post-combustion oxidant injection rate to be equal to the nominal post-combustion-oxidant injection rate, in the case of an oxidant-only post-combustion zone, or (2) the actual post-combustion oxidant injection rate and the actual post-combustion fuel injection rate to be equal to respectively the nominal post-combustion oxidant injection rate and the nominal post-combustion fuel injection rate, in the case of an oxidant-fuel post-combustion zone.

10. The method according to claim 1, whereby:

step a) includes defining a nominal main combustion operation mode for the main combustion zone with a nominal fuel supply rate and a nominal oxidant supply rate to the main combustion zone, step i) includes generating a second control signal on the basis of the first level and/or second level monitored in step h), and whereby the method further comprises:

a step k) of regulating the actual oxidant supply rate and the actual fuel supply rate to the main combustion zone in function of the second control signal.

11. The method according to claim 10, whereby in step i) the second control signal is generated on the basis of the first monitored level.

12. The method according to claim 11, whereby step a) further comprises:

i. defining an upper threshold A1up for the first monitored level, and/or ii. defining a positive upper threshold RA1up for a rate of change of the first monitored level, and whereby when the first monitored level exceeds the upper threshold A1up, and/or when the first monitored level increases at a rate greater than upper threshold RA1up, the generated second control signal causes, in step k), the actual oxidant supply rate and the actual fuel supply rate to the main combustion zone to be regulated so that the ratio between the actual oxidant supply rate and the actual fuel supply rate is higher than the ratio between the nominal oxidant supply rate and the nominal fuel supply rate.

13. The method according to claim 11, whereby step a) comprises:

i. defining a lower threshold A1low for the first monitored level, and/or ii. defining a lower threshold A2low for the first monitored level and a corresponding time period ΔtA, and whereby:

when the first monitored level is below lower threshold A1low and/or when the first monitored level remains below lower threshold A2low for at least the time period ΔtA, the generated second control signal causes, in step k), the actual oxidant supply rate and the actual fuel supply rate to the main combustion zone to be regulated so that the actual oxidant supply rate and the actual fuel supply rate correspond respectively to the nominal oxidant supply rate and the nominal fuel supply rate.

14. The method according to claim 10, whereby in step i) the second control signal is generated on the basis of the second monitored level.

15. The method according to claim 14, whereby step a) comprises:

i. defining an upper threshold D1up for the second monitored level, and whereby, when the second monitored level exceeds the upper threshold D1up, the generated second control signal causes, in step k), the actual oxidant supply rate and the actual fuel supply rate to the main combustion zone to be regulated so that the ratio between the actual oxidant supply rate and the actual fuel supply rate is higher than the ratio between the nominal oxidant supply rate and the nominal fuel supply rate.

16. The method according to claim 15, whereby step a) further comprises:

ii. defining a lower threshold D1low for the second monitored level, and/or iii. defining a lower threshold D2low for the second monitored level and a corresponding time period ΔtD, whereby, when the second monitored level is below threshold B1low or remains below lower threshold B2low during at least time period ΔtB, the generated second control signal causes in step k), the actual oxidant supply rate and the actual fuel supply rate to the main combustion zone to be regulated so that the actual oxidant supply rate and the actual fuel supply rate correspond respectively to the nominal oxidant supply rate and the nominal fuel supply rate.

* * * * *